United States Patent
Linden et al.

(10) Patent No.: US 10,065,556 B2
(45) Date of Patent: Sep. 4, 2018

(54) ILLUMINATED DOOR-OPEN WARNING FOR CENTER-OPENING DOOR

(71) Applicant: FORD GLOBAL TECHNOLOGIES, LLC, Dearborn, MI (US)

(72) Inventors: Howard Paul Tsvi Linden, Southfield, MI (US); Donald P. Iacovoni, Plymouth, MI (US); Rajesh K. Patel, Farmington Hills, MI (US); Rafic Jergess, Warren, MI (US); Paul L. Heirtzler, Jr., Northville, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 64 days.

(21) Appl. No.: 14/957,290

(22) Filed: Dec. 2, 2015

(65) Prior Publication Data
US 2017/0158115 A1    Jun. 8, 2017

(51) Int. Cl.
*B60Q 1/32* (2006.01)
*E05F 15/40* (2015.01)
(Continued)

(52) U.S. Cl.
CPC ............ *B60Q 1/323* (2013.01); *B60J 5/0493* (2013.01); *E05F 15/40* (2015.01); *G01D 11/28* (2013.01); *G08G 1/09626* (2013.01); *G08B 5/36* (2013.01)

(58) Field of Classification Search
CPC combination set(s) only.
See application file for complete search history.

(56) References Cited

U.S. PATENT DOCUMENTS

2004/0233677 A1   11/2004   Su et al.
2006/0282987 A1   12/2006   Shih et al.
(Continued)

FOREIGN PATENT DOCUMENTS

CN   201201549 Y   3/2009
CN   203347336 U   12/2013
(Continued)

OTHER PUBLICATIONS

"LED Car Door Handle Cover for Honda City, No Need to Change the Original Handle, Just Cover the Original Handle"; Alibaba.com; http://www.alibaba.com/product-detail/LED-CAR-Door-Handle-Cover-for_713919246.html; printed Aug. 31, 2015; pp. 1-4.
(Continued)

*Primary Examiner* — Thomas G Black
*Assistant Examiner* — Ana D Thomas
(74) *Attorney, Agent, or Firm* — Jason Rogers; King & Schickli PLLC

(57) ABSTRACT

A warning system for a vehicle includes a vehicle door-mounted exterior illuminable signal, a door-open indicator associated with the vehicle door, and a controller configured to actuate the exterior illuminable signal to emit light in a selected one of multiple operating modes. The operating modes may include an increased visibility operating mode differing from other operating modes in an intensity and/or pattern and/or color of light emitted by the door-mounted exterior illuminable signal. The vehicle door may be a rear-hinged door and the illuminable signal may be associated with a handle of the door. The controller may actuate the exterior illuminable signal in a different operating mode on receiving both of a signal from the door-open indicator and a signal from a vehicle navigational system.

10 Claims, 3 Drawing Sheets

(51) Int. Cl.
*B60J 5/04* (2006.01)
*G01D 11/28* (2006.01)
*G08G 1/0962* (2006.01)
*G08B 5/36* (2006.01)

(56) References Cited

U.S. PATENT DOCUMENTS

| | | | | |
|---|---|---|---|---|
| 2008/0290668 | A1* | 11/2008 | Ieda | B60R 25/24 292/198 |
| 2012/0065858 | A1* | 3/2012 | Nickolaou | B60Q 9/008 701/70 |
| 2015/0377160 | A1* | 12/2015 | Bott | F02D 41/0245 95/1 |
| 2016/0123200 | A1* | 5/2016 | Ramappan | F02D 37/02 60/285 |
| 2017/0210282 | A1* | 7/2017 | Rodriguez Barros | G03B 21/00 |

FOREIGN PATENT DOCUMENTS

| | | | | |
|---|---|---|---|---|
| EP | 1479857 | A1 | 11/2004 | |
| JP | 2012-76623 | * | 4/2012 | ............... B60J 5/00 |

OTHER PUBLICATIONS

English machine translation of CN201201549Y.
English machine translation of CN203347336U.

* cited by examiner

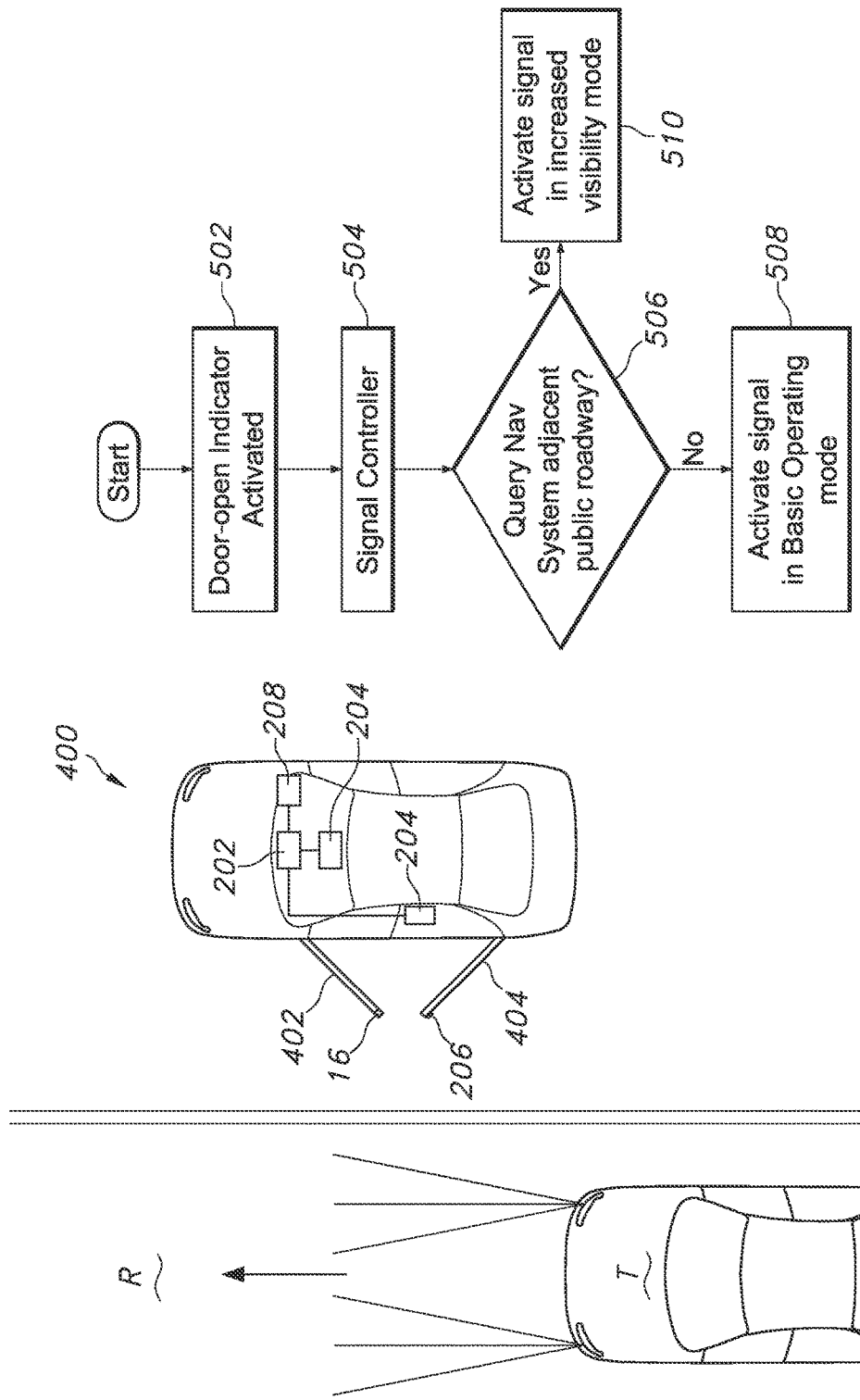

ILLUMINATED DOOR-OPEN WARNING FOR CENTER-OPENING DOOR

TECHNICAL FIELD

This disclosure relates generally to motor vehicle doors, and more particularly to an illuminating door-open warning signal for center-opening door designs.

BACKGROUND

Multiple safety features are provided with the modern motor vehicle. One such feature is a door-mounted warning indicator provided on a rear interior surface of a vehicle front-hinged door. Examples of such warning indicators include reflectors, interior lights, etc. As shown in FIG. 1A, when a vehicle 10 is stopped near a roadway R with the vehicle doors 12, 14 closest to the roadway R opened, the door-mounted warning indicators 16 are visible to oncoming traffic T, thus improving safety.

Center-opening or rear-hinged door designs are popular in certain vehicle types for their improved vehicle side design and ease of passenger ingress/egress. However, with such door designs, conventional warning signals such as door reflectors, interior door lights, etc. are substantially non-functional because they cannot be seen by traffic approaching the vehicle from the rear. As shown in FIG. 1B, in a similar situation as shown in FIG. 1A wherein a vehicle 10 is stopped near a roadway R and a rear-hinged door 18 is opened, a conventional door-mounted warning indicator 16 cannot be seen by oncoming traffic T.

Accordingly, a need is identified in the art for improved warning indicators for use with vehicle doors. To solve this and other problems, the present disclosure relates to a door-mounted warning system. Advantageously, the described system includes a door-mounted warning indicator operable in a plurality of modes, including an enhanced visibility mode for when the vehicle is determined to be positioned adjacent to a public roadway.

SUMMARY

In accordance with the purposes and benefits described herein, in one aspect a warning system for a vehicle is described including a vehicle door-mounted exterior illuminable signal, a door-open indicator associated with the vehicle door, and a controller configured to actuate the exterior illuminable signal to emit light in a selected one of a plurality of operating modes. The plurality of operating modes may differ one from the other one or more of intensity, pattern, and color of light emitted by the door-mounted exterior illuminable signal. The controller actuates the exterior illuminable signal in a basic operating mode on receiving a signal from the door-open indicator. The controller actuates the exterior illuminable signal in an increased visibility operating mode that is different from the basic operating mode on receiving both of a signal from the door-open indicator and a signal from a vehicle navigational system. The door-open indicator may be one or both of a door-ajar sensor and a door release switch.

In embodiments, the vehicle door is a rear-hinged door. In other embodiments, the illuminable signal may be associated with a handle of the door. In still other embodiments, the signal from the vehicle navigational system indicates that the vehicle is positioned adjacent to a roadway. In still yet other embodiments, the controller may be configured to actuate a vehicle emergency indicator system on receiving the signal from the navigational system.

In another aspect, a warning system for a vehicle is described including a vehicle door-mounted exterior illuminable signal, a door-open indicator associated with the vehicle door, a vehicle navigational system, and a controller configured to actuate the exterior illuminable signal to emit light in a selected one of a plurality of operating modes on receiving a signal from one or both of the door-open indicator and the navigational system. The plurality of operating modes may differ one from the other one or more of intensity, pattern, and color of light emitted by the door-mounted exterior illuminable signal. The controller actuates the exterior illuminable signal in an increased visibility operating mode on receiving both of a signal from the door-open indicator and a signal from the vehicle navigational system. The door-open indicator may be one or both of a door-ajar sensor and a door release switch.

In embodiments, the vehicle door is a rear-hinged door. In other embodiments, the illuminable signal may be associated with a handle of the door. In still other embodiments, the signal from the vehicle navigational system indicates that the vehicle is positioned adjacent to a roadway. In still yet other embodiments, the controller may be configured to actuate a vehicle emergency indicator system on receiving the signal from the navigational system.

In the following description, there are shown and described embodiments of the disclosed door-mounted warning system. As it should be realized, the system is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed door-mounted illuminated warning signal, and together with the description serve to explain certain principles thereof. In the drawing:

FIG. 4 depicts a vehicle including the door-mounted warning system of FIG. 2; and FIG. 5 depicts in flow chart form operation of the system of FIG. 2.

Reference will now be made in detail to embodiments of the disclosed storage compartment assembly, examples of which are illustrated in the accompanying drawing figures.

DETAILED DESCRIPTION

As summarized above, the present disclosure describes a door-mounted warning system for a vehicle. Preliminarily, while the disclosure primarily describes the system in association with a handle of a rear-hinged vehicle door, it will readily be appreciated by the skilled artisan that the described structures may be modified for disposition in association with other portions of a vehicle door and with other vehicle door types. Therefore, the descriptions will not be taken as limiting.

Figure 2:
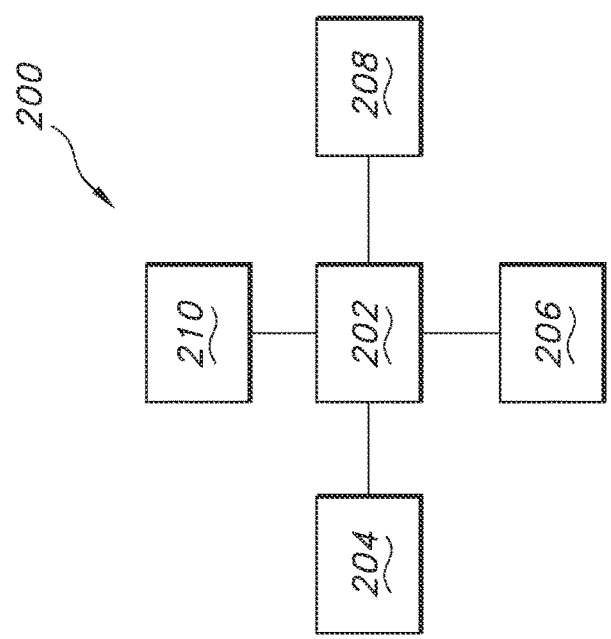
FIG. 2 depicts a door-mounted warning system according to the present disclosure.

FIG. 2 provides a graphical depiction of a door-mounted warning system 200 according to the present description. As shown therein, the system 200 includes a controller 202 in operative communication with a variety of vehicle systems, including as shown one or more door-open indicators 204, one or more vehicle door-mounted exterior illuminable signals 206, a vehicle navigational system 208, and a vehicle emergency or hazard indicator system 210. As is known, the vehicle emergency or hazard indicator system 210 comprises one or more actuable lights, typically emitting an amber colored light, which when actuated flash intermittently to indicate a hazard condition.

A variety of controllers 202 are contemplated for use herein. In one embodiment, the controller is the vehicle Body Control Module (BCM), which as is known is an electronic control unit responsible for monitoring and controlling various electronic accessories in a vehicle's body. Typically the BCM controls various functionalities of a vehicle such as power windows, power mirrors, air conditioning, immobilizer system, central locking, etc.

Likewise, numerous suitable vehicle navigational systems 208 are known and contemplated for use herein. At a basic level, a vehicle navigational system 208 utilizes a suitable geographical positioning system such as a satellite-based global positioning system (GPS) or other satellite navigational device to obtain a vehicles geographical coordinate and map it to a location on a roadway, as an address, etc. Other navigational devices such as various drivetrain sensors, accelerometers, gyroscopes, etc. may be included in the navigational system 208 to supplement and increase reliability of the system in the event of temporary failure of the satellite-based technology.

Various door-open indicators 204 are known in the art and contemplated for use herein. In one embodiment, the door-open indicator 204 is a door-ajar sensor, which as is known indicates a door-open status by way of a mechanical or electronic switch which, on interruption of a contact and opening of an electronic circuit, issues a signal to the controller indicating that the door with which the door-ajar sensor is associated has been opened. In another embodiment, the door-open indicator is a door release switch associated with an electronic door lock and/or an automated door. On user actuation of the door release switch, a signal issues to the controller indicating that the door with which the door release switch is associated has been instructed to open.

Figure 3:
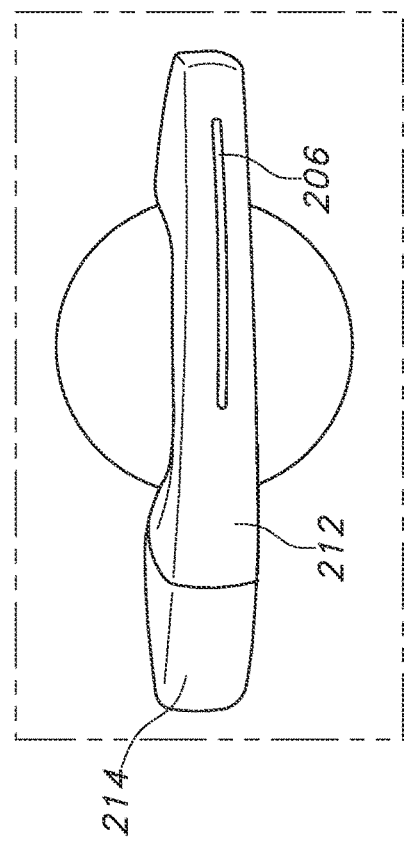
FIG. 3 depicts a vehicle door including an illuminable warning signal according to the present disclosure.

FIG. 3 shows a vehicle door 212 including a vehicle door-mounted exterior illuminable signal 206 according to the present disclosure. As shown, the illuminable signal 206 is associated with a handle 214 of the door, although mounting the signal 206 elsewhere is contemplated. As will be appreciated, the exterior illuminable signal 206 may comprise any suitable light source, including one or more of a light-emitting diode (LED), printed LED, a fiber optic, a light pipe, an incandescent lamp, a halogen lamp, a fluorescent lamp, and others. In turn, the illuminable signal 206 may be configured in any shape desired, including a strip as shown, an arrow, etc.

It will be appreciated also that the illuminable signal 206 may be configured to emit light in various operating modes, which may differ in one or more of intensity of emitted light, emitted light pattern, emitted light color, and others. Mechanisms for accomplishing these differences in emitted light are well-known. For example, the intensity of light emitted from, e.g., LEDs may be altered by changing the number of LEDs actuated, by altering a voltage supplied to the LEDs, etc. Altering an emitted light pattern may be accomplished by sequentially actuating a plurality of LEDs in a predetermined pattern to create an illusion of motion/animation. Emitted light color may be altered by use of LEDs emitting differently colored light, by placing a suitable color filter such as a colored substrate or photoluminescent dye over a light source, and others.

Figure 1B:
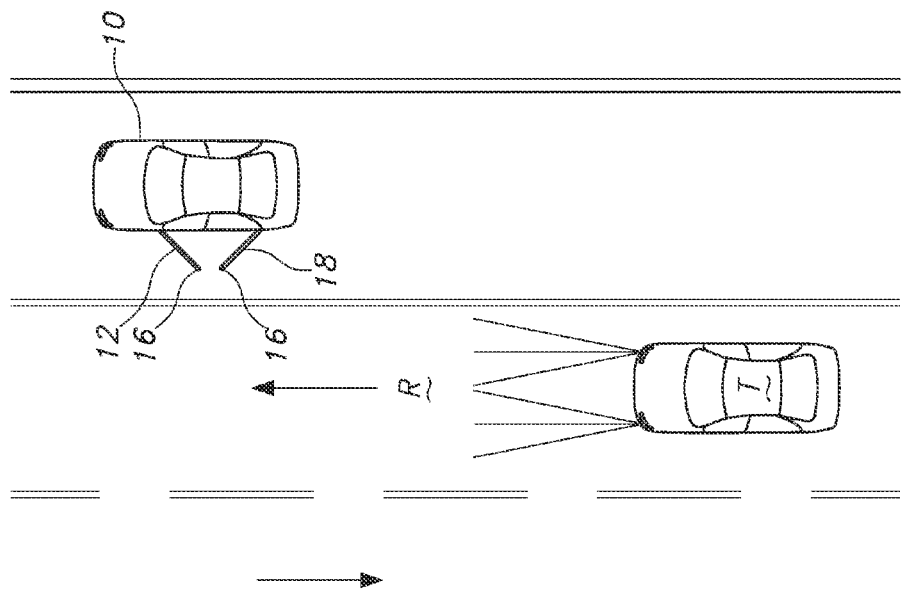
FIG. 1B depicts an alternative embodiment of the vehicle door-mounted warning indicator of FIG. 1A.
Figure 1A:
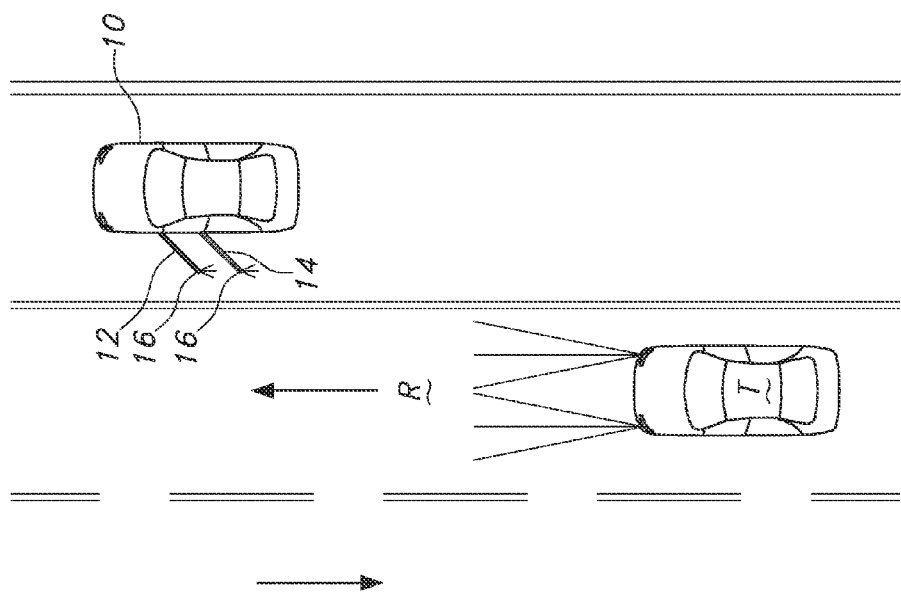
FIG. 1A depicts a prior art vehicle door-mounted warning indicator.

Operation of the door-mounted warning system 200 according to the present description will now be described. FIG. 4 illustrates a vehicle 400 equipped with the system 200, parked adjacent to a roadway R, for example parked on the roadway R shoulder. Roadway-adjacent doors of the vehicle 400 are opened, such as a front-hinged driver's side door 402 including a conventional reflector 16 as depicted in FIGS. 1A and 1B and a rear-hinged rear door 404. Door 404 includes the illuminable signal 206 depicted in FIG. 3, associated with the door 404 handle. As discussed in the description of FIG. 2, a controller 202 is operatively associated with the illuminable signal 206, with a vehicle navigational system 208, with a door-open indicator 204, and with a vehicle emergency or hazard warning system 210.

FIG. 5 illustrates in flow chart form the operation of the warning system 200. At step 502, opening a vehicle door 404 as shown in FIG. 4 actuates the door-open indicator 204, causing it to send a signal to the controller 202 at step 504. On receipt of the signal from the door-open indicator 204, at step 506 the controller 202 queries the vehicle navigational system 208. If the vehicle navigational system 208 determines that the vehicle position is not adjacent to a roadway, for example that the vehicle is parked in a parking lot or driveway a distance away from a roadway, the controller causes the illuminable signal 206 to actuate in a basic operating mode (step 508), emitting light at a first intensity and/or pattern and/or color. For example, the signal 206 may emit light at the first intensity without flashing. Alternatively, the light emitted may be a first color, such as amber. Of course, combinations of light intensity and/or pattern and/or color are possible for the basic operating mode.

If the vehicle navigational system 208 determines that the vehicle position is adjacent to a roadway, for example on a roadway shoulder as shown in FIG. 4, the controller 202 causes the illuminable signal 206 to actuate in a different operating mode such as an increased visibility operating mode (step 510), emitting light at a second intensity and/or pattern and/or color that is different from that of the basic operating mode. For example, the signal 206 may emit light at a second intensity that is greater than the first intensity. The signal 206 may emit light in a flashing or intermittent pattern, or by sequential actuation of LEDs to create an illusion of animation as described above. Alternatively, the light emitted may be a second color that is different from the first color, such as red. Of course, combinations of light intensity and/or pattern and/or color are possible and contemplated herein for the increased visibility operating mode.

Obvious modifications and variations are possible in light of the above teachings. For example, other user-selected or automatic operating modes could be provided for the described illuminable signal 206, providing increased or lessened intensity, pattern, and/or color of emitted light. As one non-limiting examples, switches or other dedicated actuators could be provided to allow a user to select between the above-described or other operating modes, such as the default operating mode, the increased visibility operating mode, a "stealth mode" wherein the warning system 200 is disabled, and others. Alternatively, the user could select an operating mode wherein the increased visibility operating mode is actuated but the vehicle hazard warning system 210 is not. Still more, the controller 202 could be configured to receive a signal from a daylight sensor of known configuration, whereby when the daylight sensor indicates a sufficient amount of ambient light the system 200 will not be activated by the controller.

All such modifications and variations are within the scope of the appended claims when interpreted in accordance with the breadth to which they are fairly, legally and equitably entitled.

What is claimed:

1. A warning system for a vehicle, comprising:
   a vehicle door-mounted exterior illuminable signal;
   a door-open indicator associated with a vehicle door; and
   a controller configured to actuate the exterior illuminable signal to emit light in a basic operating mode on receiving a signal from the door-open indicator and in an increased visibility operating mode differing from the basic operating mode in an intensity and/or pattern and/or color of light emitted on receiving a signal from the door-open indicator and a signal from a vehicle navigational system indicating that the vehicle is positioned adjacent to a roadway;
   wherein the controller is further configured to actuate a vehicle emergency indicator system on receiving the signal from the navigational system.

2. The warning system of claim 1, wherein the vehicle door is a rear-hinged door.

3. The warning system of claim 1, wherein the door-open indicator is one or both of a door-ajar sensor and a door release switch.

4. The warning system of claim 1, wherein the exterior illuminable signal is associated with a handle of the vehicle door.

5. A vehicle including the warning system of claim 1.

6. A warning system for a vehicle, comprising:
   a vehicle door-mounted exterior illuminable signal;
   a door-open indicator associated with a vehicle door;
   a navigational system; and
   a controller configured to actuate the exterior illuminable signal to emit light in a basic operating mode on receiving a signal from the door-open indicator and in an increased visibility operating mode differing from the basic operating mode in an intensity and/or pattern and/or color of light emitted on receiving a signal from the door-open indicator and a signal from the navigational system indicating that the vehicle is positioned adjacent to a roadway;
   wherein the controller is further configured to actuate a vehicle emergency indicator system on receiving the signal from the vehicle navigational system.

7. The warning system of claim 6, wherein the vehicle door is a rear-hinged door.

8. The warning system of claim 6, wherein the door-open indicator is one or both of a door-ajar sensor and a door release switch.

9. The warning system of claim 6, wherein the exterior illuminable signal is associated with a handle of the vehicle door.

10. A vehicle including the warning system of claim 6.

* * * * *